No. 648,011. Patented Apr. 24, 1900.
J. F. WILLIAMS.
VAPOR LAMP.
(Application filed Dec. 19, 1898.)

(No Model.) 3 Sheets—Sheet 1.

Attest:
A. C. Burdine
D. E. Burdine

Inventor:
John F. Williams
by Dodge and Sons,
Att'ys.

No. 648,011. Patented Apr. 24, 1900.
J. F. WILLIAMS.
VAPOR LAMP.
(Application filed Dec. 19, 1898.)

(No Model.) 3 Sheets—Sheet 2.

Attest:
C. C. Burdine.
D. E. Burdine

Inventor:
John F. Williams
by Dodge and Sons,
Att'ys.

No. 648,011. Patented Apr. 24, 1900.
J. F. WILLIAMS.
VAPOR LAMP.
(Application filed Dec. 19, 1898.)
(No Model.) 3 Sheets—Sheet 3.
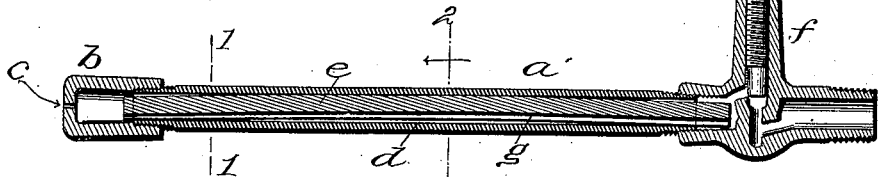
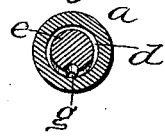 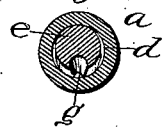
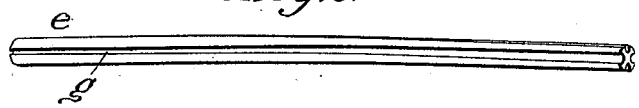
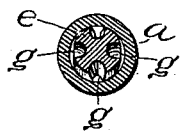
Attest:
C. C. Burdine
D. E. Burdine
Inventor:
John F. Williams,
by Dodge and Sons,
Attys.

UNITED STATES PATENT OFFICE.

JOHN F. WILLIAMS, OF KANSAS CITY, KANSAS, ASSIGNOR TO THE ECONOMY GAS LAMP COMPANY, OF KANSAS CITY, MISSOURI.

VAPOR-LAMP.

SPECIFICATION forming part of Letters Patent No. 648,011, dated April 24, 1900.

Application filed December 19, 1898. Serial No. 699,701. (No model.)

*To all whom it may concern:*

Be it known that I, JOHN F. WILLIAMS, a citizen of the United States, residing at Kansas City, in the county of Wyandotte and State of Kansas, have invented certain new and useful Improvements in Vapor-Lamps, of which the following is a specification.

My present invention pertains to improvements in vapor-lamps, and has to deal more particularly with certain devices for directing the heat to and around the vaporizing tube or chamber and also to certain improvements in the construction of the vaporizing-tube itself.

The invention is illustrated in the accompanying drawings, wherein—

Figure 1:
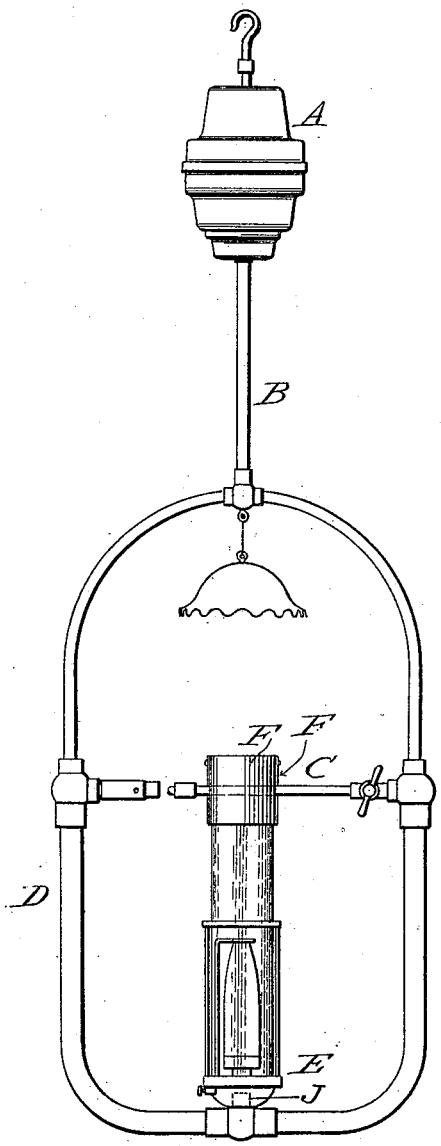
Figure 2:
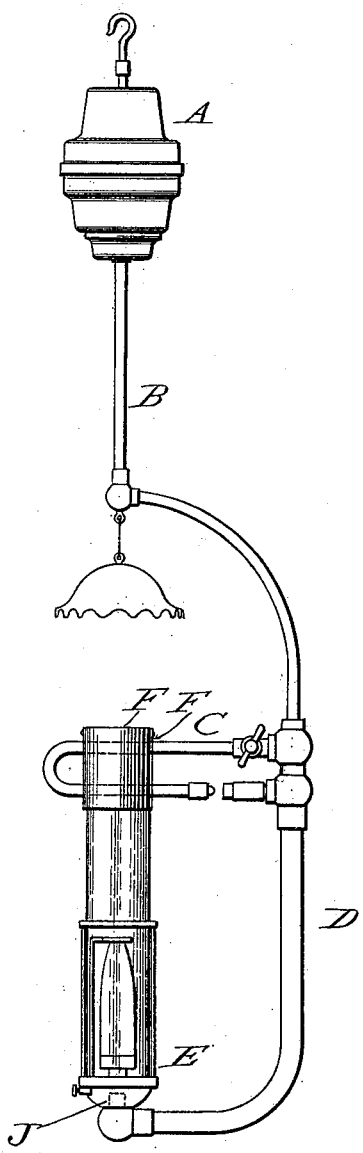
Figure 3:
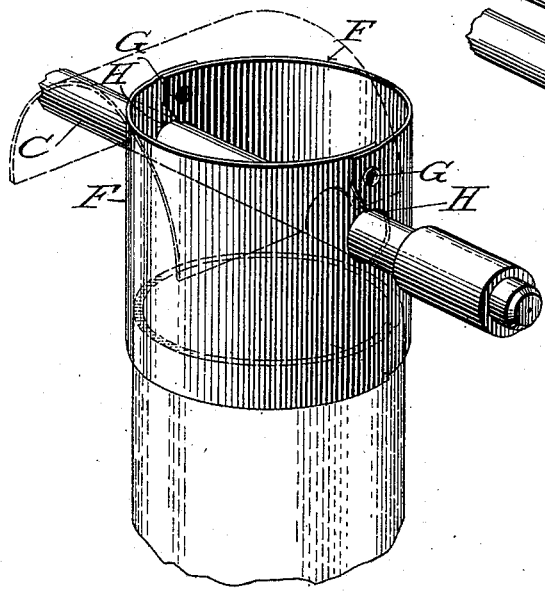
Figure 4:
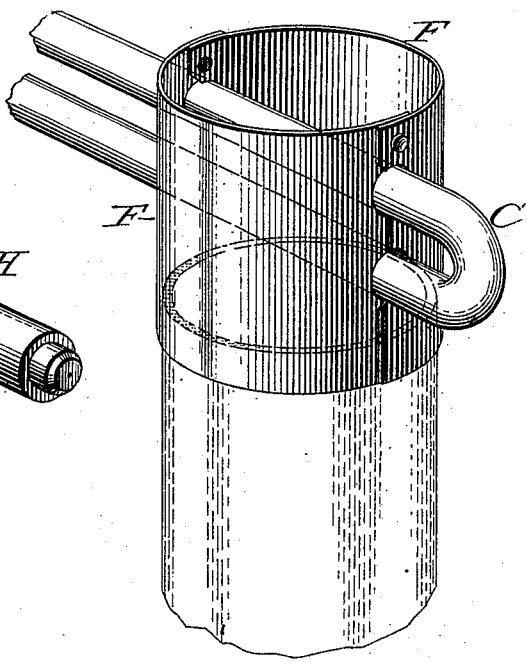
Figure 5:
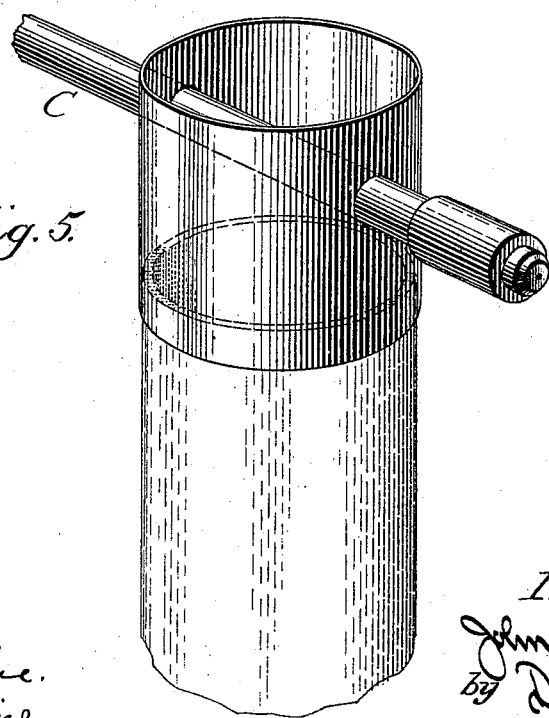

Figure 1 is a side elevation of the lamp; Fig. 2, a similar view showing a modified form; Fig. 3, a perspective view of a portion of the vaporizing-tube and chimney and the shell or collar; Fig. 4, a similar view, the vaporizing-tube being of the form illustrated in Fig. 2; Fig. 5, a perspective view of a modified form of the shell or collar; Fig. 6, a longitudinal sectional view of the vaporizing-tube; Fig. 7, a cross-sectional view on the line 1 1; Fig. 8, a similar view on the line 2 2; Fig. 9, a perspective view of a modified form of rod or bar designed to be placed within the vaporizing-tube; and Fig. 10, a cross-sectional view of a vaporizing-tube, showing a rod of the form illustrated in Fig. 9 placed therein.

In my former patent—namely, No. 606,435, dated June 28, 1898—there was shown and described a lamp of the form illustrated in Figs. 1 and 2, comprising in general terms a reservoir A, a supply-pipe B, leading therefrom to a vaporizing-tube C, a mixing-chamber D for the vapor and air, and a burner E.

The first part of my present invention has to deal with the means employed for confining and directing the heat arising or emanating from the burner to and around the vaporizing-tube, it of course being understood that the heat of the flame is employed to generate the vapor from the hydrocarbon oil which is used in the lamp.

In order to properly confine and direct the heat, I employ a shell or collar mounted upon or carried by the vaporizing-tube and extending down and around the upper end of the chimney.

In the form illustrated in Figs. 1 and 3, wherein a straight vaporizing-tube is shown, it comprises two curved sections F, pivoted together at their upper corners, as at G, and provided with notches or recesses H upon their opposing edges, the recesses being placed opposite, so that as the parts are closed together there is formed a circular opening for the reception of the vaporizing-tube. It will be noted that the shell or collar extends slightly above the vaporizing or generating tube, so that any heat which passes up from the chimney I must of necessity pass around the tube before it can escape to the atmosphere.

By making the shell in two sections it can of course be more readily applied to the tube and chimney, though it is feasible, though not as handy for use, to form the shell in one cylindrical piece, as in Fig. 5, and place it on the vaporizing-tube, making the openings therein for the tube large enough to pass over the tip or placing the shell on the tube before it is screwed to place. With this construction when placing the chimney and burner in position the burner is elevated with the chimney, the chimney passing up into the shell until the burner can pass over and onto its support J. (Shown in dotted lines in Figs. 1 and 2.) With the pivoted construction one section may be swung out into the position indicated in dotted lines in Fig. 3 and the chimney and burner elevated and removed.

In Figs. 2 and 4 the shell or collar is shown in connection with a vaporizing-tube which is bent back upon itself. With this form the adjacent edges of the sections of the collar are formed with two notches or recesses which embrace the two sections of the tube.

Not only does the shell serve to direct and confine the heat, but it also prevents any cross-draft over the top of the chimney below the vaporizing-tube. Being made of metal, the shell or collar also serves to assist in heating the tube by induction.

Manifestly it will make no difference how the sections of the shell or collar are hinged together, and the manner shown is simply for the purpose of illustration. While the shell or collar is designed, primarily, for the purpose above described, it also serves to steady the lamp-chimney, which is a matter of some moment where the device is used in a fixture which is complete in itself.

With any of the forms it will be noted that the shell, collar, or hood is so mounted as to occupy a position between the generator and the chimney of the burner over the top of the chimney to form a continuation of the same.

A second part of my present invention relates to an improved generating-tube. (Shown in Figs. 6 to 10, inclusive.)

In the form shown in Figs. 6, 7, and 8 the generator comprises a tube $a$, provided with a cylindrical bore, a tip $b$, secured upon the outer end of the tube and provided with a minute opening $c$, an expansion-chamber $d$ intermediate the end of the tube and the opening $c$, and a rod $e$, mounted within the tube. A suitable valve $f$ will of course be employed for admitting the hydrocarbon fluid to the tube. Rod $e$ is preferably cylindrical in cross-section and has formed in its face a groove or channel $g$, extending from end to end. Said groove is widest and deepest at that end next to the valve, its depth and width growing gradually less toward the tip. The rod is also slightly bent, as indicated in Fig. 6, so that it will be held in its adjusted position in the tube, the points of contact being at its ends and center. The bearing-surface of the rod and tube being small and the rod being thus practically out of contact with the inner face or wall of the tube, there will be formed an annular space around the rod throughout practically the entire length thereof, thus forming an extended vaporizing-surface to which the fluid is presented in a thin film or layer. As the groove narrows toward its outer end the area for the fluid and vapor will consequently be less toward the tip, and any undue pressure which may be generated will act back toward the valve rather than toward the tip, thus preventing the vapor issuing therefrom in spurts.

In Fig. 9 I have shown a rod formed with a series of tapering grooves, and in Fig. 10 have illustrated the relation of such a rod to the tube.

While I have shown the bar as formed with one and with four grooves, I do not desire to limit myself to these numbers, as any number of grooves may be employed that is found desirable. So, too, I do not desire to limit myself to the use of the shell or collar in connection with the specific vaporizing tube or fixture herein shown and described, as it is manifest that the collar will act in the same manner with any other form of generator.

Having thus described my invention, what I claim is—

1. In a vapor-lamp, the combination of a burner; a chimney therefor; a vaporizing-tube passing over the chimney; and a shell or collar pivotally mounted on the tube and extending down and around the upper portion of the chimney.

2. In a vapor-lamp, the combination of a burner; a chimney therefor; a vaporizing-tube passing over the chimney; and a longitudinally-separable shell or collar mounted on the tube and extending down and around the upper part of the chimney.

3. In a vapor-lamp, the combination of a burner; a chimney therefor; a vaporizing-tube passing over the chimney; and a shell or collar comprising two curved sections F hinged together at their upper ends, and provided with recesses or notches H in their adjacent edges, substantially as described.

4. A generator for vapor-lamps comprising a tube having a cylindrical bore; and a rod or bar mounted in said tube and provided with a series of tapering grooves, substantially as described.

5. An oil-gas lamp having a generator located above the burner and heated thereby, and a hood supported by and loosely mounted on the generator so as to be moved between the generator and the chimney of the burner over the top of the chimney to form a continuation of the same, or to be moved from between the said parts, as and for the purpose set forth.

6. In a vapor-burning lamp, the combination with a suitable burner provided with a chimney and a mantle of incandescing material, a vaporizing-tube arranged over the chimney to be heated from the burner, a chimney-cap formed of hinged sections arranged upon said vaporizing-tube and around the top of the chimney, a supply-pipe communicating with said vaporizing-tube, and a mixing-tube arranged between said vaporizing-tube and the burner, substantially as set forth.

7. A generator for vapor-lamps, comprising a tube having a cylindrical bore, and a rod or bar of smaller diameter mounted therein, whereby an annular chamber or space is formed intermediate the tube and rod, said rod or bar being provided with a groove or channel formed in its face, the groove growing narrower toward the discharge end of the generator, substantially as described.

8. A generator for vapor-lamps, comprising a tube having a cylindrical bore, and a rod or bar of smaller diameter mounted therein, whereby an annular chamber or space is formed intermediate the tube and rod, said rod being provided with a series of tapering grooves, substantially as described.

In witness whereof I hereunto set my hand in the presence of two witnesses.

JOHN F. WILLIAMS.

Witnesses:
  M. M. SWEETMAN,
  C. M. BROWN.